United States Patent [19]

Petrovic et al.

[11] Patent Number: 4,970,179
[45] Date of Patent: Nov. 13, 1990

[54] MOLYBDENUM DISILICIDE ALLOY MATRIX COMPOSITE

[75] Inventors: John J. Petrovic; Richard E. Honnell; W. Scott Gibbs, all of Los Alamos, N. Mex.

[73] Assignee: The United States of America as represented by the United States Department of Energy, Washington, D.C.

[21] Appl. No.: 462,256

[22] Filed: Jan. 9, 1990

[51] Int. Cl.$^5$ .................. C04B 35/56; C04B 35/58
[52] U.S. Cl. ................................................ 501/92
[58] Field of Search ........................................ 501/92

[56] References Cited

U.S. PATENT DOCUMENTS

| | | | |
|---|---|---|---|
| 2,412,373 | 12/1946 | Wejnarth | 501/92 |
| 3,036,017 | 5/1962 | Schrewelius | 501/92 |
| 3,246,275 | 4/1966 | Schrewelius | 501/92 |
| 4,119,573 | 10/1978 | Ishida et al. | 252/519 |
| 4,323,484 | 4/1982 | Hattori et al. | 252/521 |

OTHER PUBLICATIONS

John J. Petrovic, "SiC Whisker-MoSi$_2$/WSi$_2$ Alloy Composites," Los Alamos National Laboratory report LA-UR-88-3605, submitted to American Ceramic Society Annual Meeting in Indianapolis, Ind., Apr. 1989.
D. H. Carter et al., "SiC-MoSi$_2$ Composites," Los Alamos National Laboratory report LA-UR-88-3136 was presented at the 13th Annual Conference on Composite Materials and Structures, Cocoa Beach, Fla., Jan. 18-20, 1989.
D. H. Carter et al., "SiC-MoSi$_2$ Composites." This article will be published as part of the Proceedings of the Conference of Item 5, above.
J. J. Petrovic et al., "SiC Reinforced-MoSi$_2$/WSi$_2$ Alloy Matrix Composites." This article will be published in the Journal of the American Ceramic Society.
Technical Information on Kanthal Super 1900 Heating Elements, the Kanthal Corporation, Hallstahammar, Sweden, Oct. 1988.

Primary Examiner—Mark L. Bell
Attorney, Agent, or Firm—Richard J. Cordovano; Paul D. Gaetjens; William R. Moser

[57] ABSTRACT

Compositions of matter consisting of matrix matrials having silicon carbide dispersed throughout them and methods of making the compositions. A matrix material is an alloy of an intermetallic compound, molybdenum disilicide, and at least one secondary component which is a refractory silicide. The silicon carbide dispersant may be in the form of VLS whiskers, VS whiskers, or submicron powder or a mixture of these forms.

1 Claim, 3 Drawing Sheets

MOLYBDENUM DISILICIDE ALLOY MATRIX COMPOSITE

BACKGROUND OF THE INVENTION

This invention relates to the art of materials science and, more particularly, to nonmetallic materials and powder metallurgy. This invention is the result of a contract with the Department of Energy (Contract No. W-7405-ENG-36). Ceramic materials have certain outstanding properties, such as high temperature strength, corrosion resistance, low density, and low thermal expansion, which make them attractive materials for high temperature applications. However, ceramics differ from metals in one very important aspect; they do not show any yield upon loading. The lack of a stress-relieving characteristic, which gives ceramics their brittle nature and low tolerance for flaws, is a major drawback to using them in high-temperature structural applications.

There is a class of materials which offers the advantages of a ceramic and certain of the beneficial mechanical characteristics of a metal. These materials are intermetallics, which at high temperature have the excellent properties of a ceramic, but mechanically behave more like a metal, since they show yielding and stress-relieving characteristics.

Molybdenum disilicide ($MoSi_2$) is an intermetallic compound which has potential for structural use in oxidizing environments above 1200 C. It has a melting point of 2030 C. and its oxidation resistance at high temperature is very good. Mechanically, $MoSi_2$ behaves as a metal at high temperatures; it undergoes a brittle-to-ductile transition at approximately 1000 C. Thus, $MoSi_2$ has a stress-relieving characteristic at high temperatures. The major problems impeding the use of $MoSi_2$ as a high temperature structural material with potential use temperatures in the range of 1200–1800 C. are its relatively low strength at high temperatures and its brittleness, which may be referred to as lack of fracture toughness, at low temperatures. Fracture toughness may be defined as resistance to fracture. At low temperatures, strength is limited by brittle fracture, while at high temperatures, it is limited by plastic deformation or creep. For this material to be a viable structural material at high temperatures, both its elevated temperature strength and its room temperature fracture toughness must be improved. The present invention addresses the problem of high temperature strength, though improvement in low temperature strength and fracture toughness may also be realized.

Silicon carbide whiskers made by a vapor-liquid-solid (VLS) process have been used to reinforce $MoSi_2$ by means of dispersion strengthening mechanisms. This resulted in improved ambient temperature fracture toughness and a near doubling of strength at 1200 C. compared to room temperature strength. The use of silicon carbide whiskers made by a vapor-solid (VS) process as a reinforcing material provided an improvement over VLS whiskers at high temperatures, but further improvement in strength at high temperatures is needed. This improvement may be attained by replacing a portion of the $MoSi_2$ matrix with one or more refractory metal silicides. The refractory silicide will provide a solid solution strengthening effect or precipitation strengthening effect. Also, there are advantages in using SiC in powder form as the reinforcing material.

SUMMARY OF THE INVENTION

This invention is compositions of matter, each consisting of a matrix material having silicon carbide dispersed throughout it, and methods of making the compositions. A matrix material is an alloy of an intermetallic compound, molybdenum disilicide, and at least one secondary component which is a refractory silicide chosen from a group consisting of tungsten disilicide ($WSi_2$)
niobium disilicide ($NbSi_2$)
tantalum disilicide ($TaSi_2$)
molybdenum trisilicide ($Mo_5Si_3$)
tungsten trisilicide ($W_5Si_3$)
niobium trisilicide ($Nb_5Si_3$)
tantalum trisilicide ($Ta_5Si_3$)
titanium trisilicide ($Ti_5Si_3$)
titanium disilicide ($TiSi_2$)
chromium disilicide ($CrSi_2$)
zirconium disilicide ($ZrSi_2$)
yttrium disilicide ($YSi_2$) and
vanadium disilicide ($VSi_2$)

A matrix alloy may contain more than one of the secondary components. The silicon carbide dispersant may be in the form of VLS whiskers, VS whiskers, or submicron powder or a mixture of these forms. A matrix alloy has a composition of from about 50 to about 90 mole percent $MoSi_2$ with the balance being one or more of the secondary component refractory silicides. An inventive composition contains from about 70 to about 90 volume percent of the matrix alloy with the balance being silicon carbide.

DETAILED DESCRIPTION OF THE INVENTION

Figure 1:
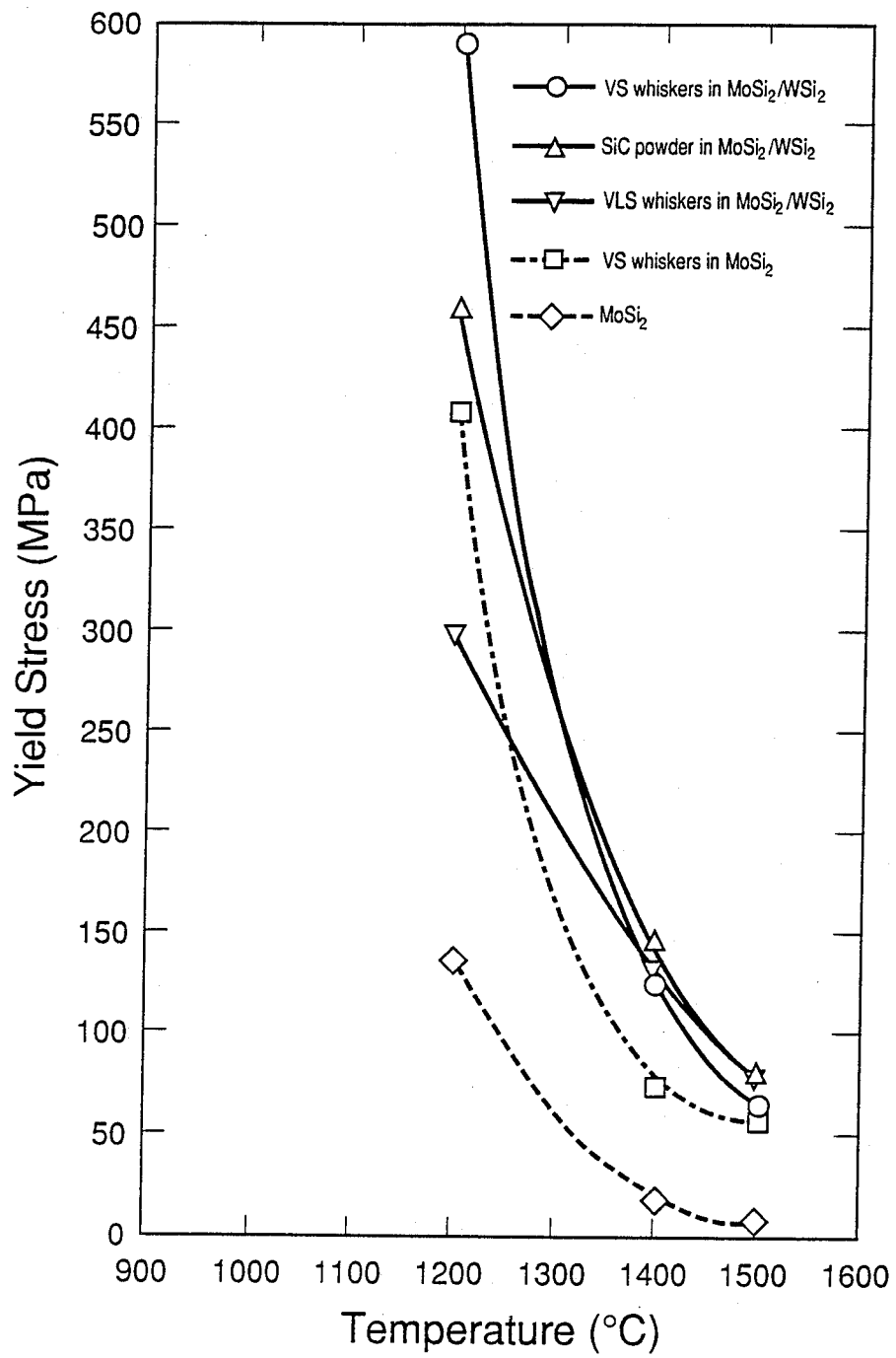
FIG. 1 shows yield stress versus temperature for inventive compositions and other materials.

Table I gives certain properties of $MoSi_2$ and of preferred refractory silicides which are alloyed with $MoSi_2$ to form the matrix materials of the present invention. Additional refractory silicides which may be used as secondary components of the matrix alloy are titanium disilicide, chromium disilicide, zirconium disilicide, yttrium disilicide, and vanadium disilicide. A matrix material ranges in composition from about 50 to about 90 mole percent $MoSi_2$ with the balance of from about 10 to about 50 mole percent being one or more of the refractory silicides. A composition of this invention contains from about 70 to about 90 volume percent of the matrix alloy with the balance of from about 10 to about 30 volume percent being silicon carbide (SiC). The SiC used in this invention may be in the form of VS whiskers, VLS whiskers, or submicron powder or a mixture of two or three of these forms.

There are numerous silicides which might be used as secondary components of the matrix alloys. Preferred alloying silicides should have a melting point near or higher than that of $MoSi_2$, good oxidation resistance, and thermodynamic stability with SiC. The preferred refractory silicides used in this invention were chosen by reference to their density, melting point, strength, oxidation resistance, and compatibility with $MoSi_2$. For example, $NbSi_2$ has the desirable characteristics of a lower density than $MoSi_2$ combined with a reasonably high melting point. $TaSi_2$ has a high density, which is a disadvantage, but its higher melting point than $MoSi_2$ makes it useful in the present invention. Other silicides which are not in the preferred group but might be desirable secondary matrix components in certain applications are the disilicides of titanium, chromium, zirconium, yttrium, and vanadium; these disilicides were not used in the inventive compositions which have been made to date. All of the secondary matrix component disilicides are expected to form solid solutions with $MoSi_2$.

TABLE I

| Silicide | Matrix Materials | | |
|---|---|---|---|
| | Melting Point, C | Crystal Structure | Density g/cm$^3$ |
| $MoSi_2$ | 2030 | Tetragonal | 6.24 |
| $WSi_2$ | 2160 | Tetragonal | 9.86 |
| $NbSi_2$ | 1930 | Hexagonal | 5.66 |
| $TaSi_2$ | 2200 | Hexagonal | 9.1 |
| $Mo_5Si_3$ | 2160 | Tetragonal | 8.24 |
| $W_5Si_3$ | 2370 | Tetragonal | 14.5 |
| $Nb_5Si_3$ | 2480 | Tetragonal | 7.16 |
| $Ta_5Si_3$ | 2500 | Tetragonal | 13.4 |
| $Ti_5Si_3$ | 2130 | Hexagonal | 4.32 |

The refractory tricilicides were chosen because their high melting points are expected to cause an improvement in high temperature strength and creep resistance. It is expected that they will provide precipitation strengthened microstructures such as that of $Mo_5Si_3$ dispersed in $MoSi_2$.

Samples of compositions of this invention were made using alloys of 50 mole percent $MoSi_2$ and 50 mole percent of each of the eight alloying silicides of Table I. These matrix materials were mixed with 30 volume percent submicron SiC powder to form the inventive compositions. Table II gives values of percent of theoretical density for these samples, which were made as described below. Values are presented for matrix alloys having 50 mole percent of each component without SiC reinforcement and for inventive compositions having 50/50 matrices and 30 volume percent of submicron SiC powder.

TABLE II

| | Percent of Theoretical Density | |
|---|---|---|
| Hot Pressed Compound | Density Percent Without SiC | Density Percent With SiC Powder |
| $MoSi_2$ | 94.5 | 93.3 |
| $MoSi_2/WSi_2$ | 92.8 | 95.0 |
| $MoSi_2/NbSi_2$ | 93.4 | 95.1 |
| $MoSi_2/TaSi_2$ | 97.5 | 98.5 |
| $MoSi_2/Mo_5Si_3$ | 96.0 | 91.4 |
| $MoSi_2/W_5Si_3$ | 80.3 | 71.2 |
| $MoSi_2/Nb_5Si_3$ | 97.1 | 99.4 |
| $MoSi_2/Ta_5Si_3$ | 92.1 | 100.0 |
| $MoSi_2/Ti_5Si_3$ | 99.9 | 100.0 |

Strength data has been collected only on compositions having a matrix alloy of 50 mole percent $MoSi_2$ and 50 mole percent $WSi_2$ and containing 80 volume percent matrix and 20 volume percent SiC. $WSi_2$ was selected for use in initial strength testing primarily because it has high yield strength and also has the same crystal structure as $MoSi_2$ and nearly the same lattice parameters. Thus, $WSi_2$ can be expected to readily form solid solution alloys with $MoSi_2$. Additionally, the oxidation resistance of $WSi_2$ is reasonable, although not as good as that of $MoSi_2$. The 50/50 matrix alloy was selected for the initial testing so that the maximum alloying effect would be easily seen. It is expected that the amount of the secondary component used in the matrix alloy will depend on the application. For example, $WSi_2$ is more dense than $MoSi_2$, so that for applications where weight is important, such as aerospace applications, the minimum amount of $WSi_2$ which provides the needed properties will be used. $MoSi_2$ has been selected as the primary matrix alloy component on the basis of its desirable properties and to use less than 50 mole percent of $MoSi_2$ would cause loss of the benefit of those properties. For example, the oxidation resistance of $MoSi_2$ is superior to that of any of the secondary matrix components.

A minimum of about 10% by volume of the dispersed material is required because less would not provide the significant strengthening effect which is desired. It is difficult to make compositions having more than about 30 volume percent whiskers due to problems of blending the whiskers with the matrix alloy powder and the tendency of the whiskers to retard densification by means of skeletal interlock. When the reinforcing material is in the form of an equiaxed powder, larger amounts than 30 volume percent may be used, but to do so blurs the distinction between matrix and reinforcing material. The properties of the composition should be dictated by the matrix alloy properties and primarily by the properties of $MoSi_2$.

VLS beta-SiC whiskers made at Los Alamos National Laboratory or VS beta-SIC whiskers purchased from J. M. Huber Corporation of Borger, Tex. and designated Huber XPW2 whiskers were used to make compositions which were subjected to strength testing. Those skilled in the art are familiar with methods of making both types of whiskers. SiC whiskers are minute, high-purity, single crystal fibers. They have very high stiffness in the longitudinal direction, in which they are grown. The main difference between the two whisker types used is their size. In hot-pressed shapes of the inventive compositions, VLS whiskers were about 50 to 100 microns long, and about 3 to 15 microns in diameter, and had an aspect ratio ranging from about 10:1 to about 20:1. VS whiskers in hot-pressed shapes were from about 1 to about 5 micron, an had an aspect ratio of from about 5:1 to about 15:1. A few VS whiskers were 100 to 200 microns long in the as-purchased condition, but were broken down to less than 5 microns long during processing. Submicron SiC powder designated as Grade A and having an average particle diameter of 0.5 micron was purchased from the German Company H. C. Starck. $MoSi_2$ powder of 99.9% purity was purchased from Alfa Products of Danvers, MA. Of the secondary matrix alloy components, Alfa supplied the tungsten silicides. $Mo_5Si_3$ and $Nb_5Si_3$ were made by the inventors using methods familiar to those skilled in the art and the balance of the secondary components were purchased from Cerac Inc. of Milwaukee, WI.

SiC whiskers were pretreated before they were used in making the inventive compounds. VLS whiskers were subjected to sedimentation to remove catalyst balls and other extraneous matter. In order to eliminate clumps of whiskers and extraneous matter, a wet processing method was used for VS whiskers, as follows. Whiskers were dispersed in deionized water at a pH of about 9.5. The pH may be adjusted by use of any common base, such as sodium hydroxide or ammonium hydroxide. Ammonium hydroxide was used in this case. Experimentation in which the pH is varied has not been accomplished, but it is believed that values on the alkaline side will be satisfactory with preferred values being above about 9.5. The amount of water used was large compared to the quantity of whiskers. About 300 ml of water per 1 g of whiskers was used, which is equivalent to 0.33 wt% of whiskers in water. However, the amount of water used per unit of whiskers is not critical and may vary. Dispersion of the whiskers may be accomplished by stirring, but in order to increase the yield of usable whiskers, it is believed desirable to provide a high degree of agitation to the whisker-containing water. In our experimentation, high shear homogenation, by means of an appropriately configured agitator, and sonification were used. After dispersion, the water-whisker slurry was allowed to stand for about five minutes in order to allow matter to settle to the bottom of the vessel containing the slurry. The supernatant, which contained whiskers in suspension, was recovered by decantation. The supernatant was allowed to stand for about 24 hours and then the liquid was drained from the sediment consisting of whiskers, thus completing the pretreatment process. However, if necessary, the whiskers can be dried by any convenient method. The duration of the settling periods may vary widely from the five minutes and 24 hours used; the suspensions must stand for a sufficient period to effect the necessary separations. Those skilled in the art will appreciate that this wet processing method may be varied or that other methods may be used to accomplish removing extraneous matter and clumps from batches of whiskers. Such methods include separation by mechanical means such as centrifugation.

All of the inventive compositions were made in the same manner, as illustrated by the following example.

EXAMPLE $MoSi_2$ powder and $WSi_2$ powder were separately screened to obtain powder which passed through a 400 mesh screen (opening of approximately 37 microns) and the resulting $-400$ mesh powders were blended in a high speed mechanical blender in the amounts required to provide 50 mole percent of each.

An aqueous slip suspension containing the matrix alloy powder and SiC powder in amounts to yield a composition of 20 volume percent reinforcing material was prepared. The solids loading of the slip was about 50 weight percent. The amount of solids is not critical, but is preferably from about 40% to about 65 wt%. Deionized water having a pH adjusted to 9.5 with ammonium hydroxide was used to make the slip. The suspension was mechanically stirred and ultrasonified to keep the constituents from settling before casting was accomplished. The slip was cast into a plaster of paris mold and allowed to set. The green slip cast body was dried and then comminuted to $-10$ mesh (less than 2 mm) shards to yield a material suitable for hot pressing. measured optically. A load of 30 MPa was applied as the increasing temperature reached 1200 C. Press movement stopped when the temperature was about 1900° C., at which point heating was stopped and a hold period started. Hold time at the peak temperature of about 1900°p0 C. was about 5 minutes and then slow cooling was started, though it may be desirable to use a longer hold time of up to about one hour. When the decreasing temperature reached 1200° C., the load was slowly removed and the sample allowed to cool to room temperature.

Slip casting to form a green body and treating it by means of a size reduction process is done mainly to provide a material which is better adapted for hot pressing than a dry mixture of the components; though slip casting and grinding does also enhance dispersion. However, those skilled in the art are familiar with other methods of preparing material for hot pressing which are applicable to the compositions of this invention. Pressureless sintering (applying heat only) of a dry blend of materials may also be used to make the inventive compositions. This process is expected to be especially effective when the secondary matrix alloy is a disilicide of titanium, chromium, vanadium, yttrium, or zirconium, as these disilicides have relatively low melting points.

SiC and $MoSi_2$ are thermodynamically stable chemical species. X-ray diffraction analyses of the SiC-$MoSi_2$/$WSi_2$ composites did not indicate the presence of any reaction phases, nor was any reaction observed light optically or in the scanning election microscope (SEM). This indicated that the system SiC—$MoSi_2$—$WSi_2$ is also a thermodynamically stable one, at least up to the hot pressing temperature of 1900° C. SEM energy dispersion x-ray analyses showed that significant solid solution alloying of the $MoSi_2$ and $WSi_2$ powders took place upon hot pressing. X-ray diffraction analyses also indicated that a single phase $MoSi_2$ -$WSi_2$ solid solution was developed as a result of hot pressing.

Elevated temperature four-point bend tests were performed on compositions of the invention and on specimens of pure $MoSi_2$ and whisker-reinforced $MoSi_2$ for purposes of comparison at temperatures of 1200° C., 1400 C., and 1500° C. All testing was performed in air using an Instron mechanical testing unit, a $MoSi_2$ element furnace, SiC loading rams, and a SiC pin-$Si_3N_4$ base bend test fixture. Four-point bend tests are a method for determining the strength of a material in a relatively simple and inexpensive manner. This type of test utilizes compressive loading, which allows the test to be easily run at high temperatures. Note that strengths of ceramics may vary widely in accordance with the type of test used to determine strength. The test equipment, methods of conducting tests, and the equation used to solve for strength values are known to those skilled in the art.

Test members in the shape of rectangular bars having the dimensions $2.5 \times 5.1 \times 25.4$ mm long were diamond machined from the hot pressed disks. Preliminary investigation indicated that these materials could also be electrodischarge machined. Two load points on a 5.1 mm wide face of the test member were 9.5 mm apart and the other two load points on the opposite face were 19.0 mm apart. Each of the tests was duplicated several times and the results reported in the Figures are averages of several tests. The test members were soaked at temperature for about $\frac{1}{2}$ hour to allow equilibration. The test members were loaded using a constant strain rate of 0.0508 mm/min.

FIG. 1 presents yield stress versus temperature. Yield stress was taken as the stress which caused a 0.05 mm permanent plastic offset deviation. Yield stresses for all of the composites are significantly greater than that of pure $MoSi_2$. Values for the inventive compositions are, with the exception of one data point, greater than the pure $MoSi_2$-VS whiskers composite. At 1200° C., the VS SiC whisker-$MoSi_2$/$WSi_2$ matrix composite exhibited the highest strength, reaching a level of nearly 600 MPa, a value over 4 times higher than pure $MoSi_2$ At 1500° C., composite yield strengths were 8-10 times higher than that of pure $MoSi_2$ Strength values as high as 80 MPa were observed in two inventive compositions at 1500° C. These composite yield strength values are of significance for potential engineering applications.

Comparison of the yield stress levels of VS SiC whisker-$MoSi_2$ matrix composites and VS SiC whisker-$MoSi_2/WSi_2$ matrix composites shows that an improvement in yield strength occurred as a result of solid solution alloying of the matrix. Since the $MoSi_2$ matrix deforms by dislocation plasticity at elevated temperatures, this result indicates that dislocation motion is made more difficult due to the presence of substitutional alloying species in the matrix.

Alloy matrix composites reinforced with VS SiC whiskers exhibited the highest strengths at 1200° C. However, at 1500° C., all types of SiC reinforcements showed similar strength levels. The results for the submicron SiC powders are particularly interesting from the viewpoint of future composite development. SiC powders are more widely available than SiC whiskers and are significantly less expensive. In addition, it may be easier to fabricate composites with higher volume fractions of reinforcement material using equiaxed submicron SiC powder as compared to elongated SiC whiskers. Also, whiskers are considered to be hazardous to health whereas SiC powder is not.

Figure 2:
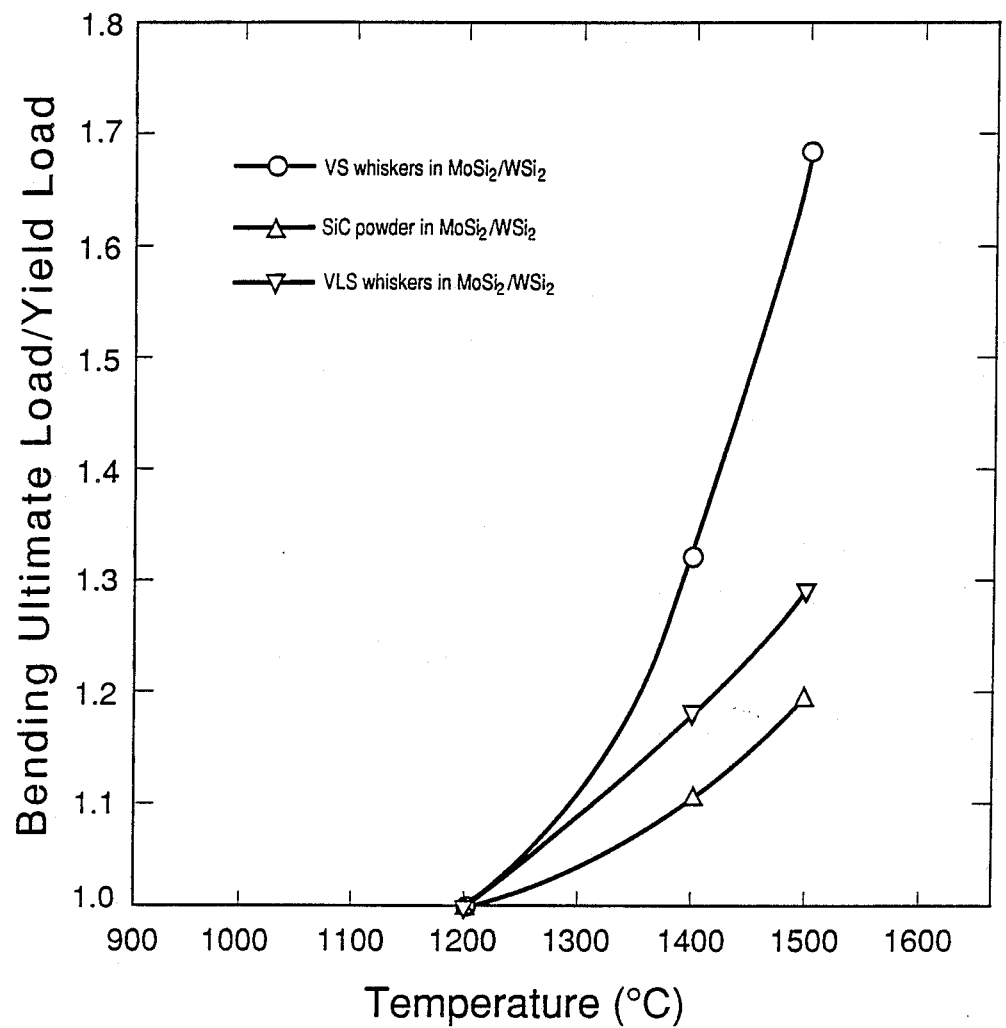
FIG. 2 shows the ratio of ultimate load to yield load versus temperature for inventive compositions.

FIG. 2 shows the ratio of the ultimate load to the yield load versus temperature. Above 1200° C., the inventive compositions behave in the same manner as metals by 10 continuing to bear load after the yield stress is exceeded rather than failing catastrophically. The ultimate load, which is the load causing the specimen to fail, is presented in FIG. 2 rather than the ultimate stress, since the bend tests which were performed do not provide reliable data for calculating ultimate stress. Ultimate stress values which are calculated assuming linear elastic behavior can significantly overestimate the actual ultimate strength, since the stress state changes upon yield in a nonlinear manner. At 1200° C., the ratios were 1.0, but they increased with increasing temperature, indicating that strain hardening took place. The VS SiC whisker composites exhibited the highest values of ultimate load/yield load ratio.

Figure 3:
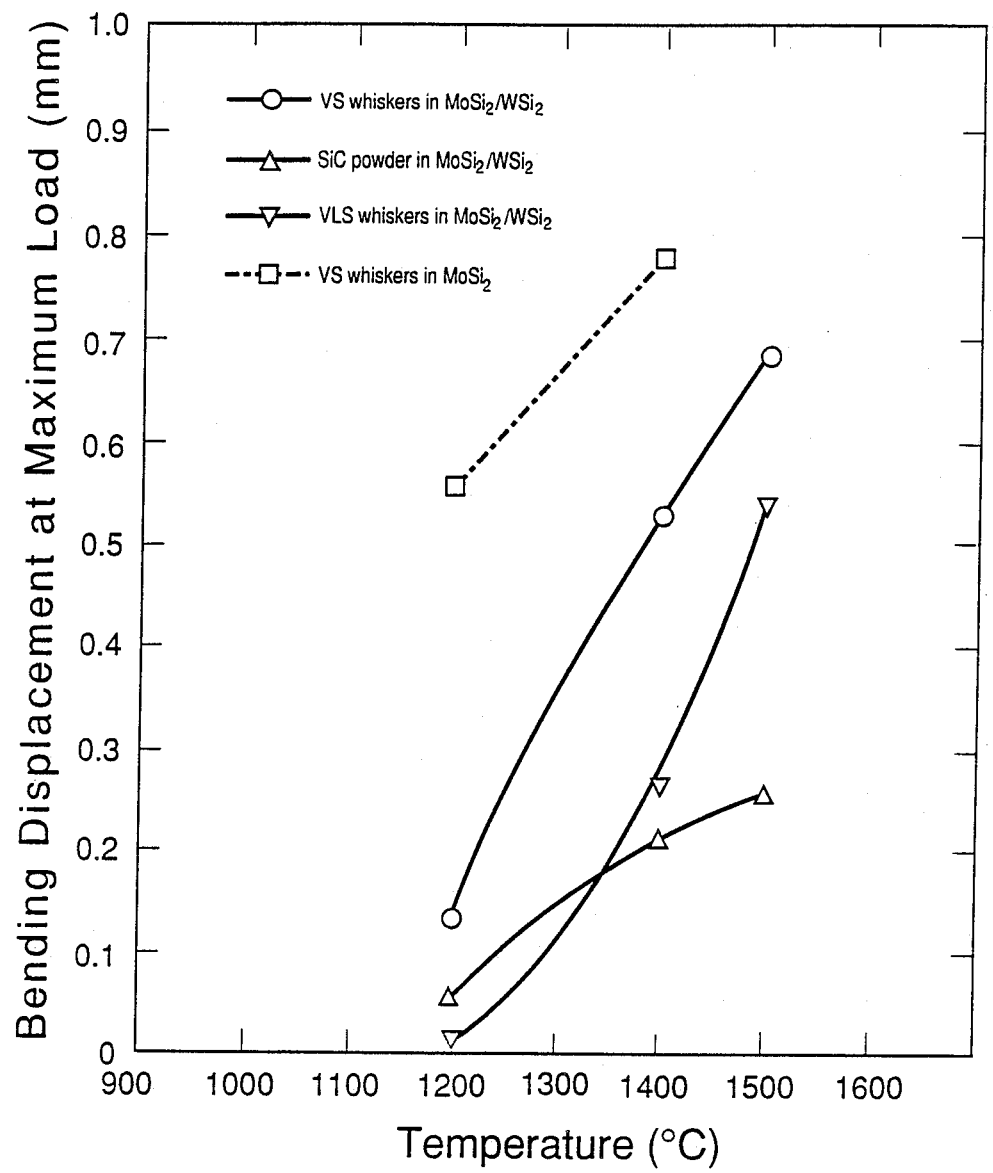
FIG. 3 shows the magnitude of the displacement at ultimate load versus temperature for inventive compositions.

FIG. 3 provides an indication of elevated temperature ductility. Bending plastic displacement versus temperature is shown. The $MoSi_2/WSi_2$ composites were less ductile than the $MoSi_2$ composite, especially at 1200° C. Of the alloy matrix composites, the VS SiC whisker reinforced material exhibited the highest ductility.

Specimens of $MoSi_2$ with SiC were hot pressed at 1800° C. rather than 1900° C.

The oxidation resistance of the inventive specimens was good in comparison with that of pure $MoSi_2$. Visual inspection of the specimens after oxidation exposure in air at 1500° C. for 1-2 hours in connection with mechanical testing showed the specimens to be little oxidized.

Since $MoSi_2$ behaves like a metal at high temperatures, it is believed that its deformation mechanism is dislocation plasticity, where dislocations, or flaws in the atomic structure, are caused to move by an applied stress, thus producing macroscopic deformation. It is believed that the reinforcing materials pin dislocations, that is, make the dislocations more difficult to move, so that the stress required to move them is larger; this increases macroscopic strength. The preferred particle size of SiC powder used in the inventive compositions is from about 0.1 to about 1.0 micron. It is believed that use of large particles, say 10 micron and larger, will not block dislocation movement as well as smaller particles and that nanosize particles will be difficult to disperse in the matrix material. Submicron powder is defined as consisting substantially of powder particles in the size range 0.1 to 1.0 micron, though particles up to about 10 microns and down to about nanosize particles may also be present.

In the range of 300° to 600° C., there exists a region where $MoSi_2$ can be completely disintegrated by a oxidation process involving molybdenum trioxide ($MoO_3$) The process is highly dependent on the microstructure and occurs only though the pore channels in the $MoSi_2$ Therefore, the problem is a function of porosity, and if the porosity can be controlled, the problem is eliminated. There is no reaction between $MoSi_2$ and SiC, even at temperatures up to the melting point of $MoSi_2$.

What is claimed is:

1. A composition of matter which is a material of construction for use at high temperatures consisting of a matrix substance having silicon carbide dispersed throughout it, said matrix substance consisting of molybdenum disilicide and at least one refractory silicide chosen from a group consisting of tungsten disilicide, niobium disilicide, tantalum disilicide, molybdenum trisilicide, tungsten trisilicide, niobium trisilicide, tantalum trisilicide, titanium trisilicide, titanium disilicide, chromium disilicide, zirconium disilicide, yttrium disilicide, and vanadium disilicide, where said matrix substance consists of from about 50 to about 90 mole percent of molybdenum disilicide, where said silicon carbide is present in an amount of from about 10 to about 30 volume percent and is in the form of submicron powder or VS whiskers or VLS whiskers or a mixture of two or three of these forms, and where said silicon carbide submicron powder consists substantially of particles having a diameter of from about 0.1 to about 2.0 micron.

* * * * *